Figure 1:
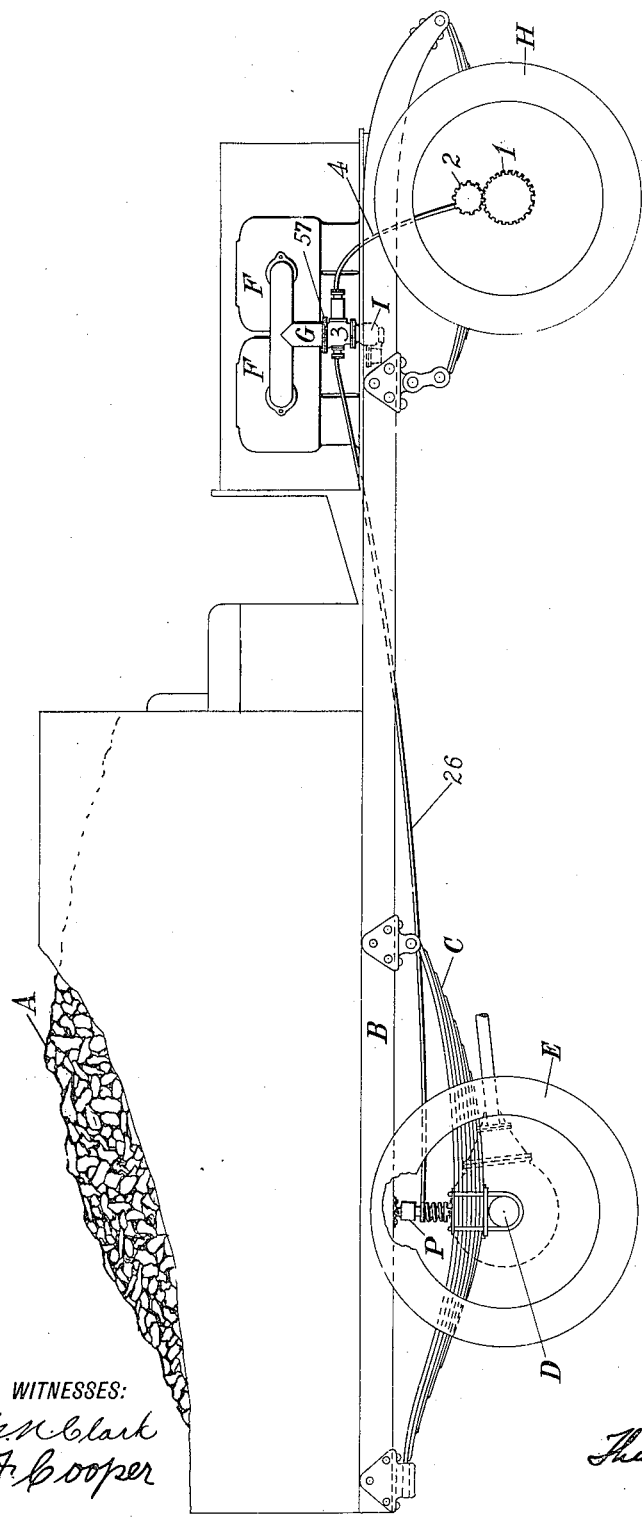

T. DOUGLAS.
MOTOR VEHICLE SPEED CONTROLLER.
APPLICATION FILED MAY 1, 1913.

1,168,179.

Patented Jan. 11, 1916.
2 SHEETS—SHEET 1.

WITNESSES:
G. N. Clark
J. F. Cooper

INVENTOR
Theodore Douglas

T. DOUGLAS.
MOTOR VEHICLE SPEED CONTROLLER.
APPLICATION FILED MAY 1, 1913.
1,168,179.
Patented Jan. 11, 1916.
2 SHEETS—SHEET 2.
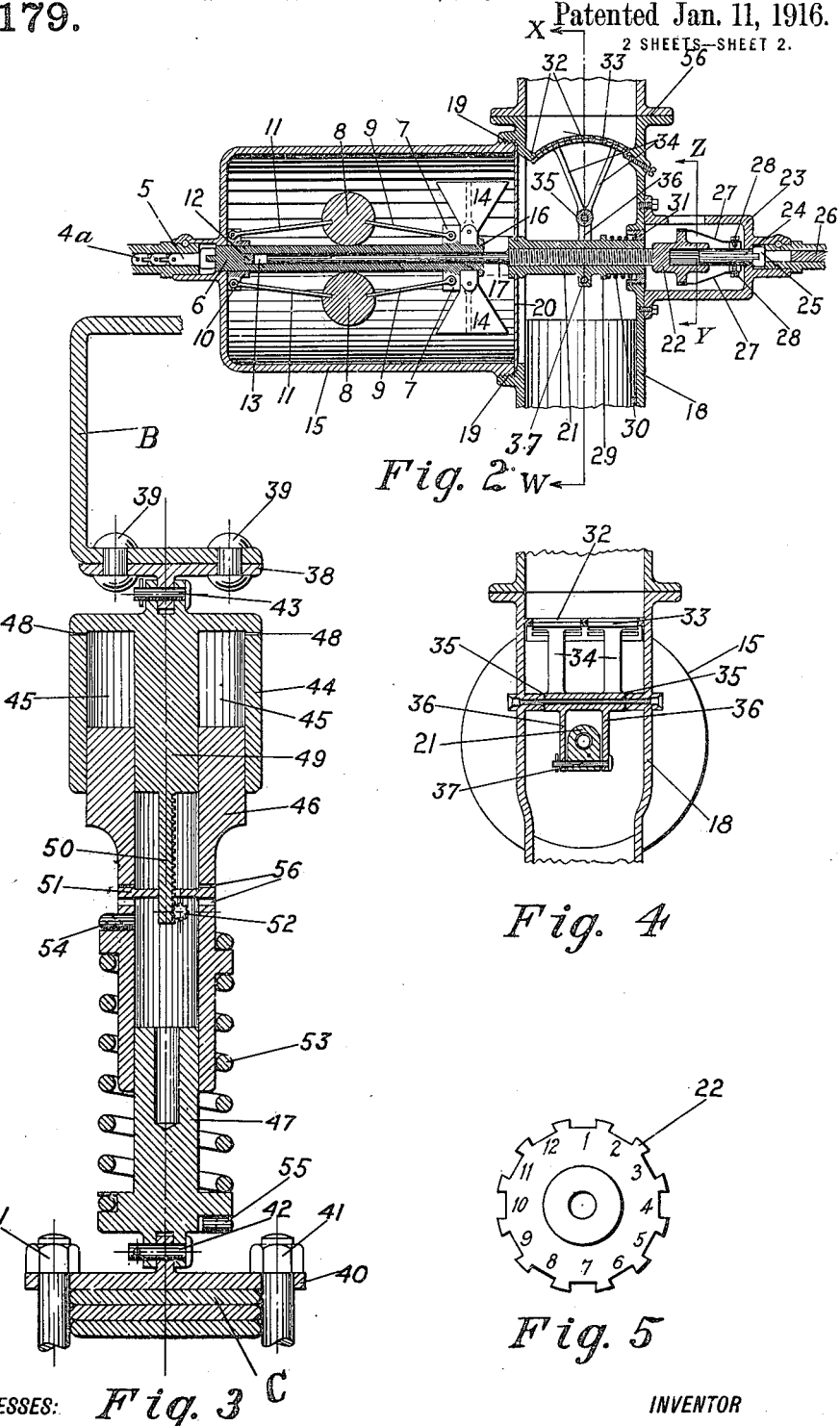

200~# UNITED STATES PATENT OFFICE.

THEODORE DOUGLAS, OF SCARBORO, NEW YORK.

MOTOR-VEHICLE SPEED-CONTROLLER.

1,168,179.

Specification of Letters Patent.

Patented Jan. 11, 1916.

Application filed May 1, 1913. Serial No. 764,889.

*To all whom it may concern:*

Be it known that I, THEODORE DOUGLAS, a citizen of the United States, and resident of Scarboro, county of Westchester, and State of New York, have made a new and useful Invention in Motor-Vehicle Speed-Controllers, of which the following is a description and, in conjunction with the accompanying drawings, is a specification.

Some of the elements of this invention form parts of my copending applications, Serial No. 726,489, filed October 18th, 1912; Serial No. 735,432, filed Dec. 7th, 1912; Serial No. 763,098, filed April 23rd, 1913; and Serial No. 764,183, filed April 28th, 1913.

The present invention relates to motor vehicle controllers particularly suitable to motor vehicles propelled by internal combustion engines and especially to those controllers which are designed to control the maximum travel speed of the vehicle to a speed proportionate to the load carried by the vehicle.

There is a general tendency among vehicle users, knowingly or otherwise, to both overload their vehicles and to overspeed them, although this overloading and overspeeding engenders abnormal strains on all parts of the vehicle mechanism, and because of such abnormal strains their efficiency and life are rapidly depreciated. It is generally conceded by motor vehicle designers that the maximum permissible travel speed of a vehicle should be based on three factors—design of the vehicle, road conditions, and the vehicle load. Two of these factors are unavoidably constantly changing in the vehicle service, and a device which will, notwithstanding that variation, so coördinate these three factors as to permit of the driving of the vehicle when empty, or under light load, at some predetermined speed, and which will yet automatically, when the vehicle is under load, and proportionately to the amount of that load, control the maximum travel speed of the vehicle to a lesser speed, should prove of great value both to the vehicle designer and user.

The purpose of the present invention is to furnish such a controller; that is, a controller which may be manually set to limit the maximum travel speed of the vehicle while operating without load, and which will automatically, under a loaded condition of the vehicle, curtail the maximum vehicle speed to a lesser speed which shall be proportionate to the increasing weight of the load carried by the vehicle, and, to a certain extent, to the roughness of the road over which the vehicle travels.

This controller unit consists of three elements, as follows: first, a load gage interposed between the running gear of the vehicle and its load and which is influenced by the load of the vehicle proportionately and progressively as its load is increased; second, a governor interposed between the source of the power fluid of the vehicle and its motor in such a manner that all of the power fluid used for the propelling of the vehicle must pass through the governor; and, third, interconnecting means between the governor and the vehicle speed whereby there is imparted to the governor an impulse proportionate to the speed of the vehicle, said impulse, influenced by the governor valve setting, limiting the maximum vehicle speed, and further suitable interconnecting means between the load gage and the governor by which the setting of the governor valve is automatically adjusted by the load gage proportionately to the load carried by the vehicle.

For a clear understanding of my invention reference is made to the accompanying drawings, consisting of two sheets, in which, Figure 1 shows a side elevation of a motor vehicle with the three elements of the controller applied thereto. Fig. 2 is a vertical longitudinal section of the motor governor. Fig. 3 is a vertical section of the load gage. Fig. 4 is a vertical cross section of the governor valve chamber, on the line W—X, of Fig. 2, looking in the direction of the arrows, and, Fig. 5 is an elevational view, along the line Y—Z, of Fig. 2, of the setting member of the governor valve, looking in the direction of the arrows.

Referring now to the drawings in detail, A, Fig. 1, represents the load carried by the body of the vehicle and supported by the load, or frame member, B, which in turn is supported by the spring C, the axle D, and the wheel E. F, F represent an internal combustion motor of which G is its intake manifold. H is one of the forward wheels of the vehicle to which is attached the gear 1 for the propelling of the pinion 2, thus imparting to 2 a proportionate speed of H, which is conveyed to the governor 3 by the flexible shaft and connections 4. I is the carbureter of the motor connected with its power fluid supply and through which, and through the governor 3, and the manifold G must pass all the power fluid used to propel the motor. P is a load gage interposed between B and C.

In Fig. 2 the governor 3 is shown in detail, and the driving end of the flexible shaft 4 is shown as 4ª. This shaft terminates at the governor end in a head-piece 5 provided with a slot into which slot is fitted a tongue of the governor driving spindle 6, and to this spindle are rigidly attached two governor spring supports 7, 7, designed to carry the governor weights 8, 8, by means of the springs 9, 9, and at its opposite end this spindle is provided with a collar 10, slidably mounted upon the spindle and connected to the governor weights 8, 8, by the springs 11, 11. The collar 10 is provided with a block 12 which passes transversely through the spindle by means of the slot-opening therein 13, in which slot it is designed to move as the collar 10 moves up and down the spindle under the influence of the centrifugal action of the governor weights 8, 8, on the rotation of the spindle 6. 14, 14 is a webbed bearing rigidly attached to the governor casing 15, which casing is designed to contain and to support the governor parts. Through the design of the part 7, 7, it having also the function of a collar, and the collar 16, the bearing 14 is enabled to support the spindle 6 for both radial and thrust movement. The spindle 6 is hollow from its collar 16 end to its slot 13, the hollow interior and the slot being connected. In this hollow interior a valve stem 17 is so fitted that the rotation of the spindle 6 does not influence its position, the spindle rotating around it. 18 is a valve chamber casing attached to the governor chamber casing 15 by screw threads 19, 19, and to effectively separate the two chambers there is inserted a metal sheet 20, as indicated. This sheet is flexible, and to it there is rigidly attached in its center a hollow cylinder 21, provided with an internal screw thread throughout its entire length and through which the valve stem 17 passes, the stem being provided with a screw thread corresponding to that of the cylinder. On the opposite side of the valve chamber casing the stem terminates in an enlarged part 22, surrounded by a third casing 23. This enlarged part 22 is hollow to a depth of approximately two-thirds of its length, and into this hollow interior there is fitted a spindle 24, provided with a tongue at its outer end. A second bearing for the spindle 24 is provided by the casing 23. Over the tongue end of the spindle 24 is fitted a head-piece 25 with a slot to engage the tongue, this head-piece being connected to a flexible wire shaft 26. On the periphery of 22 there is a central extension outward and on the outer edge of this extension there are cut a series of notches for the engagement of the springs 27, 27 which are respectively at one end rigidly attached to the spindle 24, by means of the screws and collar 28, 28, and which at their opposite ends are engaged in the notches of the extended periphery of part 22, thus rotatively locking the spindle 24 and the shaft 26 with reference to the valve stem 17. 29 is a collar surrounding the cylinder 21 and rigidly attached thereto, against which the spiral spring 30, at one of its ends, is designed to contact, and at its opposite end with the bottom of the groove of the bushing 31, provided with a thread for increasing the pressure on the spring. 32 is a wall extending transversely across the interior of the valve chamber casing 18, this wall 32 being provided with latticed openings. 33 is a movable member pivotally supported by the arms 34, and the bearing 35. This movable member 33 is also provided with a series of latticed openings corresponding in design and number to the openings in the rigid transverse member 32, and the two parts are so assembled that in one position of the part 33 its openings register with the openings in the rigid part 32, thus offering passages by which the power fluid of the motor may pass through the valve chamber casing 18; and in a second position of 33, the solid parts of the movable member 33 register with the openings of the rigid member 32, in which position also the open parts of the rigid member 32 register with the ribs, or closed parts, of the movable member 33. In this latter position the valve is closed and will prevent the passage of the power fluid through the casing 18, the casing being so constructed that any gas passing therethrough must pass through the valve. 36 is one of two downwardly extending arms of the part 33, from the bearing 35, designed to be pivotally connected with the hollow cylinder 21 by means of the pin and boss 37.

Fig. 3 shows the load gage P, in which B represents the load member, and 38 a bracket attached to the load member by means of the rivets 39, 39. C represents the load spring of the vehicle, 40 is a bracket, and 41, 41 bolts and nuts for attaching the bracket to the load spring. 42 represents a bolt and parts for connecting one end of the load gage to the bracket 40, and 43 represents a bolt and parts for connecting the opposite end of the load gage to the bracket 38. 44 is a cylindrical part having a deep annular groove 45, 45 cut therein for the movement therein of the cylindrical plunger 46, which is itself hollow and designed for the movement therein of a second plunger 47, at its lower end. 48, 48 are small holes connecting the annular groove 45, 45 with the outside atmosphere. 44 is provided with an internal downwardly extending circular part 49 designed to move in the hollow upper end of 46. 49 is provided with a rack extension part 50, supported by means of guides at its lower end in the wall 51 extending across the hollow interior of the plunger 46, through a suitable opening in which the rack member 50 is designed to travel. 52 is a pinion in mesh with the rack part 50, and having suitable bearings, not shown, in the walls of the plunger 46. 53 is a spiral spring inserted between parts 46 and 47, and having an upper end 54 rigidly connected to part 46, and a lower end 55 rigidly connected to part 47. The rigid connections of the spring 53 permit of its performing the double function of providing for both compression and tension movements between the plunger parts 46 and 47. 56 are vents for the interior of the plunger 46.

The operation of the device is as follows: It is assumed that the governor 3, through the casing 18, is connected to the intake manifold G, of the engine F, by means of the flanges 57, see Fig. 1, and that the opposite end of the casing 18 is suitably connected to the carbureter I, all these parts being so assembled that on the functioning of the motor F all of the power fluid therefor passes thereto from the carbureter I, through the casing 18 of the governor, and through the perforated valve wall 32, contained therein. As the source of the power of the motor is its power fluid, the power generated, and hence the speed of the motor and of the vehicle, may be made to vary by varying the supply of the power fluid admitted to the motor through the manipulation of a suitable governing valve, 32—33. This may be done manually, or, as in the present instance, by automatically acting means. The automatic manipulation of the valve 32—33 is effected in the following manner: Through the gear and pinion of the wheel H, a proportionate rotative speed of the wheel is conveyed by the flexible shaft 4, which is suitably connected to the pinion 2, to the centrifugal governor through the tongue and groove connection of the spindle 6 with the head-piece 5, connected to the end 4ᵃ of the flexible shaft 4. On the rotation of the spindle 6 the governor weights 8, 8, acting under the influence of centrifugal force, expand proportionately to the rotative speed of the spindle, and, in expanding, through the spring connections 9, 9, and 11, 11, they draw the sliding collar 10 upward. There will be a point in the travel of the sliding collar 10 at which the transverse block 12, moving in the groove 13, will contact with the end of the valve stem 17, and any further movement upward of the collar 10 will tend to push the valve stem 17 outward, through the end of the spindle. Any movement of the valve stem 17 is imparted to the cylinder 21, this being permitted through the flexibility of the diaphragm wall 20, and any such movement, through the connection 37, is also imparted successively to the downward extending arms 36, to the bearing 35, and to the movable valve member 33, rocking the same. This rocking of the valve member 33 will gradually close the openings in the transverse wall, or fixed member of the valve, 32, as a result of the solid parts of one member covering the open parts of the other. As the amount of opening in the member 32 becomes less, the volume of power fluid permitted to pass to the motor is proportionately lessened, and the speed thereof proportionately decreased. To quicken the action of the governor in curtailing the speed of the motor, and thus confining its operation to lower speeds, the distance between the end of the valve stem 17 and the transverse block 12 is shortened, thus making less the distance through which the block 12 must travel before contacting with the valve stem and pushing the same outward and thus influencing the position of the valve. The shorter the distance is made between the block and the end of the valve stem, the lower the speeds permitted; whereas the greater this distance is made, the greater will be the travel required, and hence the higher the speeds permitted. It follows from the above that the point at which the speed of the motor will begin to influence the position of the valve part 33 is determined by the length of the valve stem 17 between the parts 12 and 37, and this length of the valve stem may be manually changed by lifting the springs 27, 27 out of their numbered notches in the part 22, and rotating the part 22, and the stem 17 in the cylinder 21, thus screwing it farther into or out of the cylinder. The farther it is screwed out of the cylinder, or away from the block 12, the higher will be the motor speeds permitted; and the farther it is screwed into the cylinder, or toward the block 12, the lower will be the motor speeds permitted. The function of the spiral spring 30, in compression between the collar 29 and the bushing 31, is to return the valve part 33 to its open position with reference to the part 32, and to return the valve stem 17 to its initial position with reference to the block 12, after the block 12 has receded from its advanced position as a result of an induced lower motor speed. It has a further function of overcoming the influence of the low pressure within the casing 18, as a result of the engine suction, on the diaphragm 20. The means for setting the governor, as above described, refer to its manual setting, which is done to limit the maximum motor speed under all conditions of load, and for a better description of which reference is made to my copending applications, Serial No. 726,489 and Serial No. 735,432.

The present invention lies, in principle, in the supplemental setting of the valve stem 17 with reference to the block 12 through a load gage, said load gage acting under the influence of the weight of the load, and proportionately thereto, carried by the vehicle, and automatically advancing the setting of the stem 17 as the weight of the load increases, in the following manner: The load gage P, Fig. 1, is inserted, for the reasons set forth and described in my copending applications Serial No. 763,098 and Serial No. 764,183, between the members B and C, as shown. The two lower plungers, 46 and 47, are designed, when the vehicle is at rest, to be held in a fixed position relative to each other by the spiral spring 53 having both compression and tension connections 54 and 55, with those two members. As the load A is applied at B the vehicle spring C is compressed and the plunger 49 and the casing 44 are moved downward. Small openings, 48, 48, are provided in the wall of 44 for the entrance and exit of air to and from the annular groove 45, 45, and similar holes 56 are provided for the entrance and exit of air into and from the hollow interior of the plunger 46. It is obvious that as the spring 53 holds the two parts 46 and 47 in a fixed position with relation to each other, the compression of the vehicle spring, under the influence of the load, will control the downward travel of the inner cylindrical part 49, this travel being proportionate to the compression of the vehicle spring, and through its rack 50, in mesh with the pinion 52, will give the pinion 52 a rotative motion proportionate to its travel, and proportionate to the load applied to the vehicle, and to the spring. Through a suitable connection between the pinion 52 and the flexible shaft 26, this rotation of the pinion is carried to the governor 3, and imparted thereto through the connection shown in the head-piece 25, to the spindle 24, which is rotatively locked by means of the springs 27, 27 resting in the notches of the part 22, and to the valve stem 17. As the load is applied to the vehicle and the plunger 49 and rack 50 are moved farther and farther downward, rotating the pinion 52, this rotation of the pinion, through the flexible shaft 26, is carried to the governor, thus rotating the valve stem 17, provided with a right-hand thread in the cylinder 21, thus screwing the valve stem farther into the cylinder and shortening the necessary travel of the block 12, and thus confining the operation of the motor to lower speeds. As the compression of the vehicle load spring will be proportionate to the load applied thereto, and as the depression of the plunger rack 50 will be proportionate to the compression of the load spring, the rotation of the pinion 52 will also be proportionate to that compression, as will likewise, as a result of the rotation of the pinion, be the shortening of the travel distance of the block 12 as a result of the screwing inward of the valve stem 17, thus establishing and maintaining a direct relationship between the load applied to the vehicle and the maximum range of permissible speed of the motor driving the vehicle, and hence the vehicle speed.

When the vehicle is in motion there will be a varying degree of compression of the vehicle spring from causes apart from the load pressure applied to the spring, these causes being the inertia of the load, the travel speed of the vehicle, and the road inequalities over which the vehicle travels. This latter variation of spring compression will occur only during the travel of the vehicle, and its effect will be that of quick oscillations of the spring pressure, up and down. To prevent these oscillations from excessively affecting the load gage regulation of the vehicle speed, the vent holes 48, 48, connecting the annular groove 45 with the external atmosphere, are provided, it being assumed that the plunger part 46 fits snugly in its groove, and are made small so that the entrance and escape of air into and from the groove, as a result of the movement tendency of the plunger 46, will be necessarily very slow as compared with the quickness of movement and frequency of the pressure of the load spring during travel, and will hence tend to hold the plunger 46 in approximately its proper relative position with reference to the groove part 44, although a small amount of influence and variation is desired and permitted, when the wheel E strikes a pronounced road resistance. This latter permissive movement of the plunger 46 quickly establishes a still shorter distance for the travel of the block 12, and thus a slower throttling of the motor. This action of the governor corresponds to the easing of the motor over a road obstruction in its manual control, wherein the power is reduced for a moment and then reapplied. The function of the spiral spring 53 is to compensate, through its tension and compression connections with the plunger parts 46 and 47, for the extreme variations of compression in the vehicle spring as a result of road inequalities.

I do not limit myself to the various details of construction shown, nor to the assembling of the various parts and factors specifically as described, since there may be a broad variation from the details and arrangement above indicated and the device and combination will still come within the scope of my claims hereinafter set forth. This is evidenced in the possibility of placing the load gage between a load member carrying the load and a sub-member, the two being held apart by a further flexible means, and a vehicle spring acting between the sub-member and the running gear of the vehicle. Such a gage might be designed to act pneumatically, or in other ways, and through a suitable connection automatically affect the setting of a motor governor proportionately; and the governor itself need not be in assembling and principle similar to the one shown. It is simply necessary that a load influence, as a result of a variation in load weight, be used to affect an influence through a governing means for controlling the speed of the motor, and of the vehicle, in accordance with the load influence.

Having thus described my invention, what I claim and desire to secure by Letters Patent of the United States is:

1. In combination in a motor vehicle, a motor, a governor for said motor controlled by the speed of the vehicle, and means controlled by the vehicle load, for regulating said governor.

2. In combination, in a motor vehicle, a motor, a governor for said motor controlled by the speed of the vehicle, means for manually adjusting the setting of said governor, and means controlled by the vehicle load for regulating said governor automatically.

3. In combination in a motor vehicle, a motor, a governor for said motor controlled by the speed of the vehicle, and means controlled by the vehicle load for automatically adjusting the setting of said governor while the vehicle is in operation.

4. In combination in a vehicle, automatic means for regulating the speed of said vehicle, and means controlled directly by the load upon said vehicle, for controlling said first means whereby the speed of the vehicle is varied.

5. In combination, in a vehicle, a motor to propel the vehicle, a governor for said motor, and means interposed between the load on the vehicle and said governor, for automatically setting said governor.

6. In combination in a vehicle, a motor to propel the vehicle, a governor for said motor, and means interposed between the load on the vehicle and said governor, for automatically setting said governor, said governor having means whereby its setting can be manually adjusted in order to predetermine the limit of operation of said governor.

7. In combination in a motor vehicle, a frame adapted to carry a load, a spring support for said frame, a motor to propel the vehicle, a governor for said motor, and means interposed between said frame and said spring support, and operable by the relative movement thereof, for adjusting said governor.

8. In combination in a motor vehicle, a frame adapted to carry a load, a spring support for said frame, a motor to propel the vehicle, a governor for said motor, and means interposed between said frame and said spring support, and operable by the relative movement thereof, for adjusting said governor, said governor being controlled by the speed of the vehicle.

9. In combination in a motor vehicle, a frame adapted to carry a load, a spring support for said frame, a motor to propel the vehicle, a governor for said motor, and means interposed between said frame and said spring support, and operable by the relative movement thereof, for adjusting said governor, said governor being controlled by the speed of the vehicle, said governor having means whereby it can be manually, initially adjusted.

10. In combination in a vehicle, an internal combustion engine to propel the vehicle, a fuel supply to said engine, means interposed between the load on the vehicle and the fuel supply for automatically regulating the fuel supply to the engine, and manually operable means for varying the range of action of said automatic means.

11. In combination in a vehicle, an internal combustion engine to propel the vehicle, a fuel supply to the engine, means controlled by the speed of the vehicle controlling the fuel supply to the engine, and means controlled by the load on the vehicle for varying the range of action of said means controlling the fuel supply.

In testimony whereof I affix my signature in presence of two witnesses.

THEODORE DOUGLAS.

Witnesses:
 T. D. ENGLISH,
 J. F. COOPER.

Copies of this patent may be obtained for five cents each, by addressing the "Commissioner of Patents, Washington, D. C."